United States Patent [19]

Griffith et al.

[11] Patent Number: 5,084,257

[45] Date of Patent: Jan. 28, 1992

[54] SULFUR DIOXIDE REMOVAL FROM STACK GAS

[75] Inventors: Edward J. Griffith, Manchester, Mo.; James R. Brooks, Columbia, Tenn.

[73] Assignee: Monsanto Company, St. Louis, Mo.

[21] Appl. No.: 577,851

[22] Filed: Sep. 7, 1990

Related U.S. Application Data

[63] Continuation-in-part of Ser. No. 443,282, Nov. 30, 1989, abandoned.

[51] Int. Cl.$^5$ .................. C01B 17/76; B01J 23/16
[52] U.S. Cl. ..................... 423/244; 423/533; 423/535; 502/305; 502/312
[58] Field of Search ............ 423/230, 244, 242, 522, 423/532, 533, 534, 535, 244 R, 244 A; 502/305–316

[56] References Cited

U.S. PATENT DOCUMENTS

| | | | |
|---|---|---|---|
| 3,607,034 | 9/1971 | Henry | 23/168 |
| 3,798,308 | 3/1974 | Knowles et al. | 423/243 |
| 3,873,673 | 3/1975 | Teague et al. | 423/243 |
| 4,193,894 | 3/1980 | Villadsen | 252/440 |
| 4,399,112 | 8/1983 | Voirin | 423/230 |
| 4,590,049 | 5/1986 | Staudinger | 423/244 |
| 4,649,034 | 3/1987 | Rutledge | 423/244 |
| 4,867,955 | 9/1989 | Johnson | 423/244 |

FOREIGN PATENT DOCUMENTS

| | | | |
|---|---|---|---|
| 838592 | 4/1970 | Canada | 23/111 |
| 2146609 | 2/1973 | France . | |

OTHER PUBLICATIONS

"TVA Puts Burning Technology to Work", Peabody Coal Magazine, 11/88, pp. 28–29.
"The Catalytic-Oxidation System for Removing SO$_2$ from FlueGas" Monsanto Co., 1968.

*Primary Examiner*—Gary P. Straub
*Attorney, Agent, or Firm*—R. C. Loyer; R. H. Shear; J. C. Bolding

[57] ABSTRACT

A process for the removal of sulfur dioxide from gasses produced by processes resulting in off gases at elevated temperatures as in the combustion of sulfur containing fuels such as coal and fuel oil by contacting the gasses with a composition including a source of calcium, and a catalytically effective amount of a molybdenum containing catalyst for the oxidation of sulfur dioxide to sulfur trioxide which then reacts with the calcium compound to form calcium sulfate.

31 Claims, No Drawings

SULFUR DIOXIDE REMOVAL FROM STACK GAS

BACKGROUND OF THE INVENTION

This application is a continuation-in-part of copending application Ser. No. 07/443,282 filed Nov. 30, 1989, now abandoned.

This invention relates to a process for the removal of sulfur dioxide from the stack gas of a facility burning sulfur containing fuel or producing sulfur bearing off gas at elevated temperatures.

More particularly, this invention relates to a process in which small amounts of lime and a catalyst are mixed with fuel such as coal in the furnace to reduce the sulfur dioxide present in the stack gas.

DESCRIPTION OF THE PRIOR ART

For the last 20 years sulfur dioxide in the atmosphere has been considered a major problem. There is international concern about the influence of acid rain on a great variety of environmental, industrial and health problems. Coal burning electrical power generating stations have been singled out as the most likely primary source of sulfur dioxide in the atmosphere. As a result of this concern, the U.S Congress has passed Clean Air Acts that limit the use of coal containing sulfur concentrations higher than the approved percentages. This has created economic problems even for electrical power stations that are built upon coal fields because they cannot use that coal if it contains too much sulfur. Thus, there have been many projects to devise a practical method to remove the sulfur from stack gas; however, none of the proposed solutions to this problem have been completely satisfactory.

An earlier concept is shown in U.S. Pat. No. 3,607,034. After removal of solid ash constituents, the sulfur dioxide containing flue gases were heated to a temperature upwards of 400° C. and passed through a vanadium-pentoxide-containing catalyst bed where the flue gases were subjected to catalytic oxidation to convert the sulfur dioxide to sulfur trioxide. The flue gas was then cooled and exposed to water vapor which absorbed the sulfur trioxide to form sulfuric acid. The sulfuric acid was recovered to be marketed and the flue gas, then substantially free of sulfur dioxide and sulfur trioxide, was released to the atmosphere. A variety of problems caused by the complexity of the equipment have plagued this process. Some of the leading processes for the removal of sulfur dioxide from stack gases scrub the stack gas with lime slurry. These processes produce a colloidal dispersion of calcium sulfite waste liquor that must be contained within tailings ponds. While impoundments are used, they lead to all of the problems associated with ponds, and this process is generally not considered to be a satisfactory solution.

The Tennessee Valley Authority is using a combination of coal and limestone to capture sulfur dioxide emissions in its Atmospheric Fluidized Bed Combustion Project. The Project is operating a boiler that uses coal containing between 3.5% and 5% sulfur. To capture the sulfur as it is released from the burning coal, the boiler uses approximately one ton of limestone for every three tons of coal that is burned.

SUMMARY OF THE INVENTION

This invention relates to a process for the reduction or removal of sulfur dioxide from the stack gas of a facility releasing sulfur containing gases at elevated temperatures. An amount of lime, preferably in the form of calcium oxide or calcium hydroxide, sufficient to react with the sulfur Contained in the gases is allowed to contact the off gases. In addition to the lime, a molybdenum catalyst which will catalyze the oxidation of sulfur dioxide to sulfur trioxide is employed with the calcium source. Conversion of sulfur dioxide to sulfur trioxide at the elevated temperatures of the gases accelerates the reaction with the lime to form calcium sulfate which remains as an ash. Formation of calcium sulfate reduces or removes the sulfur that would be present in the stack gas as sulfur dioxide and provides a stack gas which may be released to the atmosphere.

In one embodiment, this invention relates to a process for the combustion of coal in a furnace by providing to the furnace (1) coal having a composition including sulfur, (2) a source of calcium, and a (3) catalytically effective amount of a catalyst for the oxidation of sulfur dioxide to sulfur trioxide and heating the furnace to a temperature sufficient for the combustion of the coal.

In another embodiment of this invention the gasses formed upon combustion are catalytically converted to sulfur trioxide and then converted to calcium sulfate by contact with a calcium compound in an afterburner or separate chamber located down stream from the main combustion chamber. In fact, more optimum results may be obtained in accordance with this embodiment because improved results can be obtained in the process of this invention by contacting the off gasses with the calcium source and catalyst at temperatures below about 550° C. Also, this embodiment is preferred when the sulfur containing fuel is not conveniently mixed with the calcium source prior to combustion. In particular, high sulfur fuels such as fuel oils may be burned and the combustion gasses contacted in accordance with this invention in an after burner chamber containing the calcium source and the catalyst. Further, this embodiment provides for a larger choice of catalyst in that a vanadium catalyst is also useful in addition to molybdenum catalysts.

The amount of lime employed is dependent upon the quality of the fuel being supplied to the facility, such as a coal-fired power generating plant. An amount of lime must be provided to react with the amount of elemental sulfur present within the fuel. Thus, for example, coal having a sulfur content between about 1% to about 5% elemental sulfur by weight of the coal requires the addition of from about 2.0% to about 9% calcium oxide by weight of the coal or from about 2.5% to about 12% calcium hydroxide by weight of the coal to provide at least a stoichiometric amount for the reaction.

From about 10 ppm to about 50 ppm, and preferably from about 20 ppm to about 30 ppm, by weight compared to the fuel, of a catalyst which will catalyze the oxidation of sulfur dioxide to sulfur trioxide at the elevated temperatures of the fire box was also added. The preferred catalyst is a compound which will provide a source of molybdenum, such as, for example, ammonium molybdate and other similar catalysts which may also be used. The amount of catalyst required is sufficiently small that the catalyst can be sacrificed as an expendable raw material. If desired, however, the catalyst may be recovered from the ash within the furnace.

DESCRIPTION OF THE PREFERRED EMBODIMENTS

Off gases of combustion such as are produced by electrical power generating stations are treated in accordance with this invention by contacting the gases with a mixture of a calcium compound and a molybdenum catalyst. It is preferred that the calcium compound employed is in the form of lime, calcium oxide (CaO), or slaked lime, calcium hydroxide (Ca(OH)$_2$). Calcium oxide and calcium hydroxide are the preferred sources of calcium for mixing with the coal; however, other calcium compounds such as calcium carbonate and calcium bicarbonate may also be used. While other calcium compounds may be used, these are preferred because they do not introduce other chemical elements which must then be removed and which may react to form toxic compounds.

The amount of lime that is required is dependent upon the amount of sulfur contained within the fuel that will be burned. Sufficient amounts of lime must be employed to provide a sufficient amount of calcium to react with the sulfur to form calcium sulfate which remains as ash either within the firebox or afterburner.

The reaction of calcium with sulfur containing gasses may be made easier by thoroughly mixing coal and lime prior to or during the burning of the coal to assure sufficient contact between the calcium and the sulfur trioxide that is produced.

The addition of a catalyst improves the oxidation reaction of sulfur dioxide to sulfur trioxide. For calcium oxide and calcium hydroxide as the source of calcium, the appropriate reactions are shown in the formula below.

$$2 SO_2 + O_2 \rightarrow 2 SO_3$$

$$CaO + SO_3 \rightarrow CaSO_4$$

$$Ca(OH)_2 + SO_3 \rightarrow CaSO_4 + H_2O$$

When the thermodynamics of the oxidation of sulfur dioxide to sulfur trioxide are studied, the rise in temperature to that found within a furnace favors the formation of sulfur dioxide at equilibrium. However, equilibrium is never reached and the sulfur trioxide that is formed is allowed to react with calcium oxide as quickly as possible. The reaction may thus be stated in its simplest form:

$$2S + 3O_2 + 2CaO \rightarrow 2CaSO_4$$

Calcium sulfate is very stable, melting at about 1450° C., and decomposing at even higher temperatures. It is, thus, expected that the calcium sulfate formed in the fire box will crystalize in any ash which had cooled below 1450° C.

Better results are obtained if the reaction between sulfur trioxide and calcium oxide is allowed to take place at a temperature below 550° C. Thus, it may be desirable to contact the lime and catalyst with the sulfur containing gases in a cooler after burner, or combustion chamber, downstream from or following the main furnace.

In accordance with this invention the term "elevated temperature" means any temperature above about 200° C. and most usually above about 400° C. However, in some processes off gases may have temperatures of up to about 1000° C. or higher. Although such temperatures may be employed in the process of this invention it is preferred to employ lower temperatures by allowing the off gas to cool. Such cooling may occur by allowing the off gas to contact the calcium source in an afterburner or separate chamber in accordance with this invention. In this embodiment of the invention the off gases from combustion are allowed to cool or may be cooled by an arrangement of heat extraction for useful purposes after they leave the main combustion chamber. Also, post combustion contact of off gases with the calcium compound in the catalyzed reaction of this invention is desireable because it allows the use of high sulfur fuel which may not be easily mixed with the calcium compound prior to combustion. Such fuels as high sulfur containing petroleum oil (fuel oil) is particularly applicable to the embodiment of this invention wherein the combustion gases are contacted with the calcium compound in an after burner to provide the catalytic reaction producing calcium sulfate.

In addition, the process of this invention is also useful to remove sulfur dioxide from gases released from high temperature processes wherein the release of sulfur dioxide is obtained and is in the stack gases released from the process. One such example is the roasting or smelting process for ore wherein a sulfide contained in the ore is converted to sulfur dioxide. A chamber is provided down stream from the roasting oven wherein the gases from the oven are allowed to contact the calcium compound in accordance with this invention to produce calcium sulfate. Typical examples of different ores having contained therein a metal in the form of the sulfide and usually subjected to the smelting process are those containing the metals iron, zinc, copper, lead, cadmium, mercury and boron. The quality of the air in the vicinity of metal refining processes which evolve sulfur dioxide containing gases is greatly improved by the highly efficient process of this invention. The off gases of other processes which generate sulfur dioxide at elevated temperatures can be employed in the process of this invention in similar manner as described above for the combustion of fuels and roasting of metal ores.

The preferred oxidation catalyst is a compound which will provide a source of molybdenum compounds. The preferred catalyst is ammonium molybdate, NH$_4$MoO$_4$, but other similar catalysts compounds which provide a source of molybdenum such as molybdenum oxides, molybdenum halides, molybdenum sulfides, molybdenum nitrates, molybdenum phosphates, molybdenum silicates, mixed alkali metal molybdates, alkaline earth molybdates, and other metal molybdates will also be effective. It is preferred that the catalyst be added to the coal and source of calcium in an amount sufficient to provide from about 10 ppm to about 50 ppm, and more preferably from about 20 ppm to about 30 ppm, based upon the weight of the coal. This concentration of catalyst is sufficient to catalyze the oxidation reaction of sulfur dioxide to sulfur trioxide while remaining small enough so that the catalyst can be sacrificed as an expendable raw material. If it is desired, the catalyst may be recovered from the fly ash but this should not be necessary at the low catalyst concentrations used.

Three grades of coal containing from about 1 to about 3.5% sulfur by weight of the coal were used in the Examples described below. The three grades of coal were arbitrarily called low sulfur coal, medium sulfur coal and high sulfur coal to distinguish among the three grades. Three tests were performed using each of the grades of coal. First, the untreated coal was burned and base line analyses were obtained using EPA Test Method Number 6. After working with the furnace system, it was arbitrarily decided to maintain the stack gas, that is, the gas passing through the stack to the atmosphere, at a temperature near 550° C. While an average temperature near 550° C. was maintained, brief excursions between about 800° C. and about 250° C. were not uncommon. Secondly, calcium hydroxide was added to additional samples of each grade of coal in an amount sufficient to react with 3% sulfur in the coal based upon the weight of the coal. The coal samples treated with calcium hydroxide were burned and the stack gases were analyzed. For the third test, additional samples of each grade of coal were mixed with calcium hydroxide in an amount sufficient to react with 3% sulfur by weight of the coal and with about 20 ppm by weight of coal of a catalyst, ammonium molybdate or ammonium vanadate. The coal samples mixed with calcium hydroxide and catalyst were burned and the stack gases were analyzed.

As will be shown in the Examples below, the coal samples that were mixed with lime alone showed an easily detectable decrease in the amount of sulfur dioxide in the stack gas when compared to the coal samples without lime. The coal samples mixed with lime and the ammonium molybdate catalyst produced less sulfur dioxide in the stack gas than did the coal samples which were mixed with lime but without a catalyst. The sulfur dioxide content of the stack gas from the medium sulfur content coal was reduced by the addition of the ammonium molydate catalyst to about sixty percent (60%) of the sulfur dioxide content of the stack gas from the medium sulfur coal mixed with lime. The sulfur dioxide content of the stack gas from the high sulfur coal was reduced slightly by the addition of ammonium molydate catalyst to the mixture of coal and calcium hydroxide; however, since the calcium hydroxide was limited to an amount sufficient to react with 3% sulfur based on the weight of the coal, there was not sufficient lime in this coal to react with all of the sulfur trioxide that was formed. It was noted that the amount of oxygen in the stack gas from this high sulfur coal was reduced when the ammonium molydate catalyst was mixed with the coal. This indicates that there was an increased reaction of sulfur dioxide to sulfur trioxide which would have been available to form calcium sulfate if sufficient calcium had been present.

While the preferred catalyst is one which provides a source of molybdenum, another catalyst which contained vanadium in the form of ammonium vanadate ($NH_4VO_3$) was also used in the examples below. The coal samples mixed with lime and having ammonium vanadate as the catalyst had a higher sulfur dioxide content in the stack gas than did the coal samples which were treated with lime but did not include a catalyst. This shows that the ammonium vanadate catalyst did not operate as expected at the process conditions used in the examples. However, vanadium pentoxide is widely used as a catalyst for the oxidation of sulfur dioxide to sulfur trioxide during the manufacture of sulfuric acid. The reaction of sulfur dioxide to sulfur trioxide is reversible and generally favors the formation of sulfur dioxide. Although not intending to be bound by theory, it is believed that the use of ammonium vanadate at the temperature and other conditions existing in the Examples favored the formation of sulfur dioxide over sulfur trioxide. The sulfur dioxide content of the stack gas was thus not reduced as expected because sulfur trioxide was not formed and it could not react with calcium to remove the sulfur from the stack gas. It is expected that the addition of ammonium vanadate and other vanadium containing catalysts in amounts similar to the amount of molybdenum containing catalyst added to the coal and lime mixture, that is, in an amount from about 10 ppm to about 50 ppm by weight of coal, at other process conditions, such as at lower temperatures, will demonstrate reductions in the amount of sulfur dioxide present in the stack gas. Lower temperatures which would render the vanadium containing catalyst most useful are provided by the use of an after burner or chamber where off gases are at a much lower temperature than experienced such as in the fire box of a furnace. In such embodiment the vanadium containing catalyst would aid in the conversion of sulfur dioxide to sulfur trioxide and result in the formation of calcium sulfate in accordance with this invention. Typical vanadium compounds include ammonium vanadate and vanadium oxides such as di-, tri-, tetra- and pentoxide.

In the Examples below, samples of the stack gases were collected through a tube leading to a flow meter. A measured volume of stack gas was drawn through an absorption train having three absorbers in which the first absorber contained an 80% isopropyl alcohol solution and the second and third absorbers contained a 3% hydrogen peroxide solution. The sulfur dioxide in the stack gas was cleaned in the first absorber and converted to sulfuric acid in the second and third absorbers. The contents of the second and third absorbers were mixed in a volumetric flask and then diluted with distilled water to a total volume of 100 ml. A 20 ml aliquot of the solution was mixed with 80 ml of isopropyl alcohol and titrated to precipitate barium sulfate $(BaSO_4)_2$ with a standardized 0.01 N. barium perchlorate, $Ba(ClO_4)_2$ to a pink lake end point. Two equations are shown below to calculate the sulfur dioxide content in parts per million (ppm) of the collected stack gas. First, the measured volume of the sample of stack gas must be converted to standard conditions. The equation is:

$$Vstd = Vmeter \times \frac{293}{273 + Tc} \times \frac{Bp}{29.92}$$

Where:
Vstd = The stack gas volume corrected to standard temperature and pressure,
Vmeter = The stack gas volume determined by the flow meter,
Bp = The barometric pressure, and
Tc = The average temperature (° C.) of the stack gas sample in the flow meter during the time that it is collected.

The equation to calculate the amount of sulfur dioxide in ppm in the stack gas is:

$$ppm\ SO_2 = \frac{11.21 \times (V_t - V_b) \times N \times (Vs/Va)}{Vstd}$$

Where:
Vt = Total milliliters of barium perchlorate to titrate the sample,
Vb = Blank correction in milliliters of barium perchlorate,
Vs = Total milliliters of absorption solution,
Va = Volume of aliquot, N = Normality of the barium perchlorate, and Vstd = The stack gas volume corrected to standard temperature and pressure from the equation above.

The invention will be better understood by the following Examples which, in conjunction with the general description herein above, illustrate, but do not limit, the preparation and effectiveness of this invention, an improved process for a coal burning facility in which small amounts of lime and a catalytically effective amount of a catalyst effective for the oxydation of sulfur dioxide to sulfur trioxide are mixed with the coal to reduce the sulfur dioxide present in the stack gas which is released to the atmosphere.

EXAMPLE 1

The low sulfur coal used in Example 1 had the following proximate analysis.

| LOW SULFUR COAL PROXIMATE ANALYSIS | | |
|---|---|---|
| | As Received | Dry Basis |
| % Moisture | 6.97 | — |
| % Ash | 4.18 | 4.50 |
| % Volatile | 36.20 | 38.92 |
| % Fixed Carbon | 52.63 | 56.58 |
| % Sulfur | 1.11 | 1.20 |
| Joules/Gram | 30,083 | 32,336 |

The low sulfur coal was subjected to the three tests described above in which it was burned (1) alone, (2) in a mixture containing lime in the form of calcium hydroxide, and (3) in a mixture containing lime in the form of calcium hydroxide and a catalyst, ammonium vanadate. During each test, samples of the stack gas were collected and treated as described above to determine the amount of sulfur dioxide and oxygen present in the stack gas. The results of the measurements and calculations are shown in Table I below.

TABLE I

| Coal System | Run Number | % Oxygen in Stack Gas | Average % Oxygen | $SO_2$ ppm | $SO_2$ ppm Average |
|---|---|---|---|---|---|
| Low Sulfur | 1 | | | 660 | |
| | 2 | | | 1082 | |
| | 3 | 12.5 | | 122 | |
| | 4 | 13.5 | | 336 | |
| | 5 | | | 239 | |
| | 6 | | 13 | 412 | 477 |
| Low Sulfur Plus Lime | 7 | 11 | | 203 | |
| | 8 | 11 | | 178 | |
| | 9 | 13 | | 196 | |
| | 10 | 12 | | 104 | |
| | 11 | 12 | | 145 | |
| | 12 | 12 | 12 | 275 | 184 |
| Low Sulfur Plus Lime Plus $NH_4VO_3$ | 13 | 12 | | 134 | |
| | 14 | 12.5 | | 206 | |
| | 15 | 12 | | 202 | |
| | 16 | 11 | | 246 | |
| | 17 | 12.5 | | 333 | |
| | 18 | 12 | 12 | 294 | 235 |

EXAMPLE 2

The medium sulfuric coal used in Example 2 had the following proximate analysis.

| MEDIUM SULFUR COAL PROXIMATE ANALYSIS | | |
|---|---|---|
| | As Received | Dry Basis |
| % Moisture | 3.11 | — |
| % Ash | 13.21 | 13.64 |
| % Volatile | 39.31 | 40.58 |
| % Fixed Carbon | 44.35 | 45.78 |
| % Sulfur | 2.57 | 2.66 |
| Joules/Gram | 28,416 | 29,330 |

The medium sulfur coal was subjected to the three tests described above in which it was burned (1) alone, (2) in a mixture containing lime in the form of calcium hydroxide, and (3) in a mixture containing lime in the form of calcium hydroxide and a catalyst, ammonium molybdate or ammonium vanadate. During each test, samples of the stack gas were collected and treated as described above to determine the amount of sulfur dioxide and oxygen present in the stack gas. The results of the measurements and calculations are shown in Table II below.

TABLE II

| COAL SYSTEM | RUN NUMBER | % OXYGEN IN STACK GAS | AVERAGE % OXYGEN | $SO_2$ ppm | $SO_2$ ppm AVERAGE |
|---|---|---|---|---|---|
| Medium Sulfur | 1 | 12 | | 686 | |
| | 2 | 11 | | 760 | |
| | 3 | 11 | | 748 | |
| | 4 | 11 | | 905 | |
| | 5 | 12 | | 807 | |
| | 6 | 13.5 | 12 | 673 | 763 |
| Medium Sulfur Plus Lime | 7 | 11 | | 432 | |
| | 8 | 12 | | 549 | |
| | 9 | 11.5 | | 661 | |
| | 10 | 12 | | 961 | |
| | 11 | 12 | | 845 | |
| | 12 | 12 | 12 | 595 | 673 |
| Medium Sulfur Plus Lime Plus $NH_4VO_3$ | 13 | 11.5 | | 1039 | |
| | 14 | 12 | | 645 | |
| | 15 | 12.5 | | 963 | |
| | 16 | 11 | | 789 | |
| | 17 | 11 | | 609 | |
| | 18 | 11 | 11.5 | 793 | 806 |
| Medium Sulfur Plus Lime Plus $NH_4MoO_4$ | 19 | 11 | | 358 | |
| | 20 | 10.5 | | 362 | |
| | 21 | 10.5 | | 406 | |
| | 22 | 10 | | 341 | |
| | 23 | 10.5 | | 445 | |
| | 24 | 10 | 10.5 | 596 | 375 |
| Medium Sulfur Plus Lime Plus $NH_4MoO_4$ | 25 | 12 | | 306 | |
| | 26 | 12 | | 356 | |
| | 27 | 11 | | 249 | |
| | 28 | 10.5 | | 704 | |
| | 29 | 11.5 | | 557 | |
| | 30 | 10.5 | 11 | 428 | 435 |

EXAMPLE 3

The high sulfur coal used in Example 3 had the following proximate analysis.

| HIGH SULFUR COAL PROXIMATE ANALYSIS | | |
|---|---|---|
| | As Received | Dry Basis |
| % Moisture | 4.29 | |
| % Ash | 12.80 | *13.38 |
| % Volatile | 38.19 | 39.90 |
| % Fixed Carbon | 44.72 | 46.72 |
| % Sulfur | 3.51 | 3.67 |
| Joules/Gram | 28,309 | 29,579 |

The high sulfur coal was subjected to the three tests described above in which it was burned (1) alone, (2) in a mixture containing lime in the form of calcium hydroxide, and (3) in a mixture containing lime in the form of calcium hydroxide and a catalyst, ammonium molybdate. During each test, samples of the stack gas were collected and treated as described above to determine the amount of sulfur dioxide and oxygen present in the stack gas. The results of the measurements and calculations are shown in Table III below.

TABLE III

| COAL SYSTEM | RUN NUMBER | % OXYGEN IN STACK GAS | AVERAGE % OXYGEN | $SO_2$ ppm | $SO_2$ ppm AVERAGE |
|---|---|---|---|---|---|
| High Sulfur | 1 | 11 | | 1090 | |
| | 2 | 14 | | 1077 | |
| | 3 | 14 | | 1144 | |
| | 4 | 12.5 | | 1061 | |
| | 5 | 13.5 | | 1203 | |
| | 6 | 11 | 12.5 | 1052 | 1104 |
| High Sulfur Plus Lime | 7 | 12 | | 742 | |
| | 8 | 12.5 | | 745 | |
| | 9 | 12 | | 825 | |
| | 10 | 12 | | 1190 | |
| | 11 | 11.5 | | 748 | |
| | 12 | 12 | 12 | 1003 | 852 |
| High Sulfur Plus Lime Plus $NH_4MoO_4$ | 13 | 10.5 | | 708 | |
| | 14 | 11.5 | | 799 | |
| | 15 | 10 | | 837 | |
| | 16 | 10.5 | | 988 | |
| | 17 | 10 | | 829 | |
| | 18 | 11 | 10.5 | 901 | 844 |

The reduction in the amount of sulfur dioxide present in the stack gas shown in this Example 3 under the conditions of the second and third tests in which lime was added was limited by the amount of lime that was added. As described above, for the purposes of these tests, calcium hydroxide was mixed with the coal in an amount sufficient to react with 3% sulfur based upon the weight of the coal. The high sulfur coal used in Example 3 contained about 3.5% sulfur; thus, there was insufficient calcium to react with all of the sulfur in the stack gas. If additional calcium had been present, a further reduction in the sulfur dioxide present in the stack gas would have been expected.

The above examples have demonstrated that the addition of lime to the coal in a coal burning facility will reduce the sulfur dioxide present in the stack gas. It is further demonstrated that the addition of small amounts of lime and a catalyst such as ammonium molybdate will cause a further reduction in the amount of sulfur dioxide present in the stack gas of a coal burning facility. It is also noted that the oxygen content of the stack gas was lowered when ammonium molybdate was used as the catalyst. This is further evidence of the increased reaction of sulfur dioxide to sulfur trioxide and then to calcium sulfate.

The above examples are illustrative of the invention and are for the purposes of demonstration of the advantages of this invention. Although coal is employed as the sulfur bearing fuel it is easily seen that the process of this invention is equally applicable to any sulfur containing off gas from operations such as electric power generating plants and ore roasting operations.

The foregoing description of this invention is not intended as limiting of the invention. As will be apparent to those skilled in the art, many variations on and modifications to the embodiments described above may be made without departure from the spirit and scope of this invention.

WHAT IS CLAIMED:

1. A process for the removal of sulfur dioxide from off gases from processes which produce such gases at elevated temperature which comprises contacting the gas with a source of calcium and a catalytically effective amount of molybdenum for the oxidation of sulfur dioxide to sulfur trioxide, wherein the sulfur trioxide reacts with the calcium source to form calcium sulfate.

2. The process of claim 1 wherein the sulfur dioxide off gas is produced by the combustion of sulfur containing coal.

3. The process of claim 1 wherein the sulfur dioxide off gas is produced by the combustion sulfur containing petroleum oil.

4. The process of claim 1 wherein the sulfur dioxide off gas is produced by the roasting of sulfur containing metal ore.

5. The process of claim 1 wherein said ;molybdenum is provided by a compound selected from the group consisting of ammonium molybdate, molybdenum oxides, molybdenum halides, molybdenum sulfides, molybdenum nitrates, molybdenum phosphates, molybdenum silicates, mixed alkali metal molybdate, alkaline earth molybdate and other metal molybdate.

6. The process of claim 5 wherein the calcium source is selected from the group consisting of calcium oxide, calcium hydroxide, calcium carbonate and calcium bicarbonate.

7. The process of claim 5 wherein the compound is ammonium molybdate.

8. The process of claim 7 wherein the source of calcium is calcium oxide.

9. The process of claim 2 wherein the molybdenum is provided by ammonium molybdate.

10. The process of claim 9 wherein the ammonium molybdate is added in an amount of from about 10 ppm to about 50 ppm, by weight of said coal.

11. The process of claim 10 wherein the ammonium molybdate is added in an amount of from about 20 ppm to about 30 ppm, by weight of said coal.

12. The process of claim 1 where said gases are contacted with said source of calcium and said molybdenum in a chamber downstream from said processes which produce the off gases.

13. A process for the combustion of coal in a furnace comprising:
 a. providing to said furnace:
  (1) coal, said coal having a composition including sulfur,
  (2) a source of calcium, and
  (3) an added catalytically effective amount of a catalyst for the oxidation of sulfur dioxide to sulfur trioxide, said catalyst comprising a compound providing molybdenum.
 b. combustion said coal in said furnace.

14. The process of claim 12 wherein said compound is selected from the group consisting of molybdenum oxides, molybdenum halides, molybdenum sulfides, molybdenum nitrates molybdenum phosphates, molybdenum silicates, mixed alkali metal molybdates, alkaline earth molybdates and other metal molybdates.

15. The process of claim 13 wherein said providing is performed by mixing (1) (2) and (3) together and adding the resultant mixture to said furnace.

16. The process of claim 14 wherein said compound is ammonium molybdate.

17. The process of claim 14 wherein from about 10 ppm to about 50 ppm of said compound by weight of said coal, is provided.

18. The process of claim 17 wherein from about 20 ppm to about 30 ppm of said compound, by weight of said coal, is provided.

19. The process of claim 13 wherein said source of calcium is selected from the group consisting of calcium oxide, calcium hydroxide, calcium carbonate and calcium bicarbonate.

20. The process of claim 19 wherein said source of calcium is calcium oxide.

21. The process of claim 19 wherein said source of calcium is calcium hydroxide.

22. The process of claim 19 wherein said source of calcium provides at least a stoichiometric amount of calcium sufficient to react with sulfur oxides resulting from the combustion of said coal.

23. A process for the reduction of sulfur dioxide in the stack gas of a facility for burning coal containing sulfur comprising providing in said stack gas at least a stoichiometric amount of a source of calcium to react with sulfur oxides resulting from the combustion of said coal and an added catalytically effective amount of a catalyst comprising a molybdenum compound for the oxidation of sulfur dioxide to sulfur trioxide.

24. The process of claim 23 wherein said source of calcium is selected from the group consisting of calcium oxide, calcium hydroxide, calcium carbonate and calcium bicarbonate.

25. The process of claim 23 wherein said molybdenum compound is selected from the group consisting of molybdenum oxides, molybdenum halides, molybdenum sulfides, molybdenum nitrates, molybdenum phosphates, molybdenum silicates, mixed alkali metal molybdates, alkaline earth molybdates and other metal molybdates.

26. The process of claim 25 wherein said molybdenum compound is ammonium molybdate.

27. The process of claim 25 wherein from about 10 ppm to about 50 ppm of said molybdenum compound, by weight of said coal, is provided.

28. The process of claim 27 wherein from about 20 ppm to about 30 ppm of said molybdenum compound, by weight of said coal, is provided.

29. The process of claim 23 wherein said source of calcium and said catalyst are added to said coal prior to combustion of said coal.

30. The process of claim 23 wherein said source of calcium and said catalyst are added to said gas after combustion of said coal.

31. The process of claim 23 wherein said source of calcium and said catalyst are added to the coal during combustion of the coal.

* * * * *

UNITED STATES PATENT AND TRADEMARK OFFICE
CERTIFICATE OF CORRECTION

PATENT NO. : 5,084,257
DATED : January 28, 1992
INVENTOR(S) : Edward J. Griffith and James R. Brooks It is certified that error appears in the above-identified patent and that said Letters Patent is hereby corrected as shown below:

Column 2, Line 3:    Remove "Contained" and insert --contained --.

Column 6, Line 35:   Remove "$(BaSO_4)_2$" and insert -- $(BaSO_4)$ --.

Column 10, Line 12:  Remove "amount of molybdenum" and insert -- amount of added molybdenum --.

Column 10, Line 62:  Remove "combustion" and insert -- combusting --.

Signed and Sealed this

Eighteenth Day of May, 1993

Attest:

MICHAEL K. KIRK

Attesting Officer

Acting Commissioner of Patents and Trademarks